United States Patent
Pietrusko et al.

(10) Patent No.: US 8,156,433 B2
(45) Date of Patent: Apr. 10, 2012

(54) EMBODIED MUSIC SYSTEM

(75) Inventors: Robert Gerard Pietrusko, Brooklyn, NY (US); Chandrasekhar Nataraj, Radnor, PA (US)

(73) Assignee: Villanova University, Villanova, PA (US)

(*) Notice: Subject to any disclaimer, the term of this patent is extended or adjusted under 35 U.S.C. 154(b) by 0 days.

(21) Appl. No.: 13/009,185

(22) Filed: Jan. 19, 2011

(65) Prior Publication Data

US 2011/0119065 A1    May 19, 2011

Related U.S. Application Data

(63) Continuation-in-part of application No. 11/899,077, filed on Sep. 4, 2007, now abandoned.

(60) Provisional application No. 60/842,268, filed on Sep. 5, 2006.

(51) Int. Cl.
*G06F 3/00* (2006.01)
*G10L 19/00* (2006.01)

(52) U.S. Cl. ........ 715/700; 715/727; 704/500; 700/245; 901/1

(58) Field of Classification Search .............. 715/700, 715/701, 702, 716, 727; 704/258, 270, 272; 700/245; 901/1; 446/175
See application file for complete search history.

(56) References Cited

U.S. PATENT DOCUMENTS

| | | | |
|---|---|---|---|
| 5,209,695 A | 5/1993 | Rothschild | |
| 6,400,826 B1 | 6/2002 | Chen et al. | |
| 6,650,761 B1 | 11/2003 | Rodriguez et al. | |
| 6,947,893 B1 | 9/2005 | Iwaki et al. | |
| 6,972,363 B2 | 12/2005 | Georges et al. | |
| 7,237,198 B1 * | 6/2007 | Chaney | 715/730 |
| 7,685,324 B2 * | 3/2010 | Fukui et al. | 710/8 |
| 2003/0112260 A1 * | 6/2003 | Gouzu | 345/716 |
| 2006/0111910 A1 | 5/2006 | Nelson | |
| 2007/0250212 A1 | 10/2007 | Halloran et al. | |

OTHER PUBLICATIONS

Duffy Jennings, Duffy Jennings Communications, for Intuitive Devices, Inc.; Blinkit® Lights Up iPod® Ecosystem, Unique Safety Accessory Doubles as a Flashlight and Fun Music Flasher; Los Gatos, Calif.; Mar. 9, 2006; 1 pg.

Jesse Allison and Timothy Place; SensorBox: Practical Audio Interface for Gestural Performance; Proceedings of the 2003 Conference on New Interfaces for Musical Expression, Montreal, Canada; NIME03-208; 3 pgs.

R. Mazé and L. Gaye; Sonic City; Proceedings of Cybersonica (2003).

* cited by examiner

*Primary Examiner* — Xiomar L Bautista
(74) *Attorney, Agent, or Firm* — Stradley Ronon Stevens & Young, LLP

(57) ABSTRACT

An embodied music system. The system creates an interactive interface between a listener and the external environment. The system includes a physical device located in the environment that provides sensory input to the listener. An audio signal of the system is adapted to be heard by the listener. An encoder embeds inaudible control data into the audio signal. A decoder extracts the control data from the audio signal and transmits the control data to the physical device, thereby controlling operation of the device. Finally, an audio reproduction device is connected to the decoder and plays the audio signal for the listener. The embodied music system allows the listener to experience multi-sensory compositions.

20 Claims, 13 Drawing Sheets

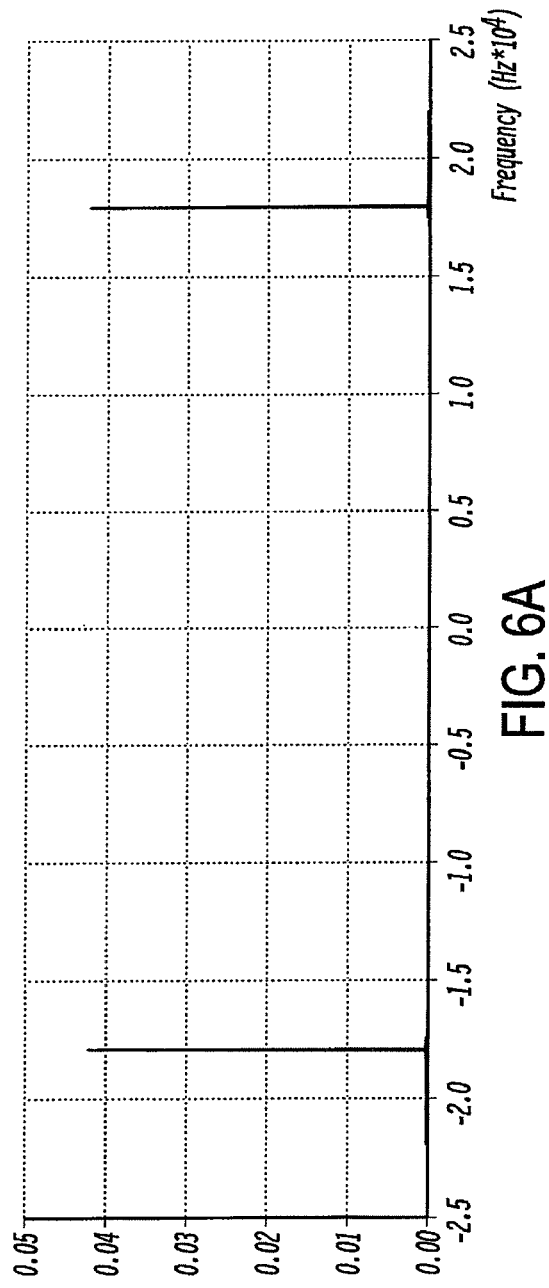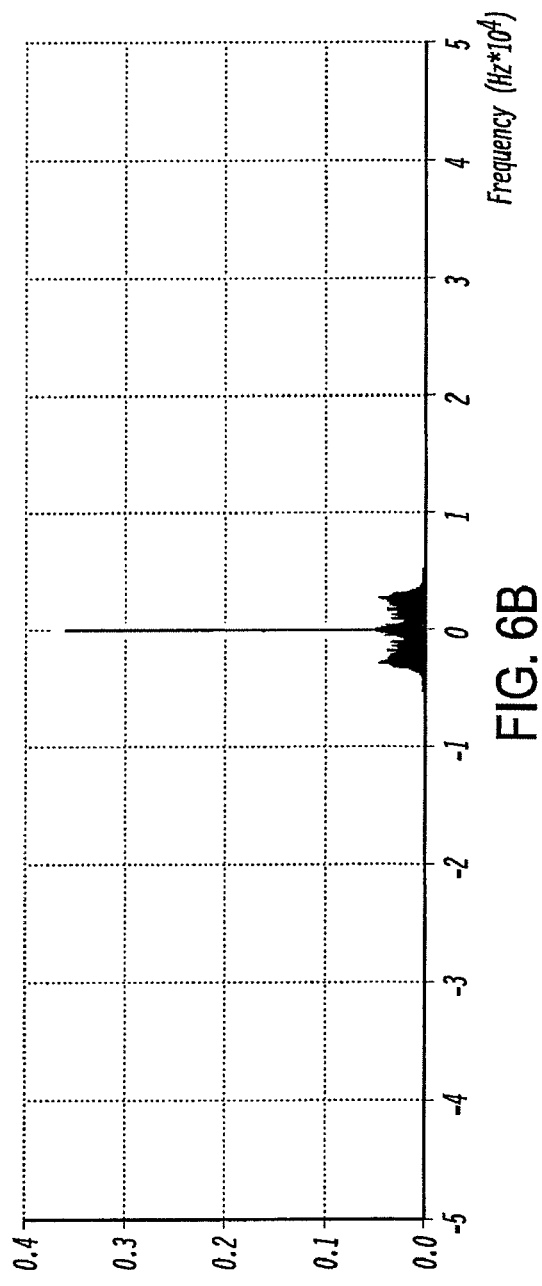

EMBODIED MUSIC SYSTEM

RELATED APPLICATION

This application claims the benefit of priority to U.S. Provisional Patent Application Ser. No. 60/842,268, filed on Sep. 5, 2006, and is a continuation-in-part of U.S. patent application Ser. No. 11/899,077, filed on Sep. 4, 2007 now abandoned. The contents of both prior applications are incorporated in this application by reference.

TECHNICAL FIELD

The present invention relates generally to the field of music interface and, more particularly, to a method of expanding the listening experience of a music composition.

BACKGROUND OF THE INVENTION

Music has been used throughout history in both public and private settings to influence mood and behavior, and to suggest appropriate emotional responses to social stimuli. Such use has given rise to many phenomena such as background music, cinematic soundtracks, and even the scientifically engineered sound offered by Muzak Holdings LLC under the brand Muzak (touted as functional music rather than entertainment because the sound affects those who hear it but does not require a conscious listening effort). Personal introspection will often show that our individually created listening experiences can also be understood by the above functional motivations. Recently, psychological research has demonstrated that listeners choose and respond to music based on internal arousal and emotional states informed by their surroundings. This research implies that music is not an elusive, disembodied experience; rather, music is directly connected to the physicality of everyday experience.

Music has a unique role among the arts. It can act as a suggestive, peripheral backdrop ("aural wallpaper") or as something in which to actively engage while consistently conveying the functional context of an environment in subtle, non-intrusive ways. Music also stands alone as the only art form that is fully standardized with a universally accepted and ubiquitous digital format, the compact disc or "CD."

Historically, music consumption has been passive. The listener simply enjoys the sounds of music either directly as played in performance venues or indirectly through technology such as recording studios, radios, portable audio players such as that sold by Sony under the brand "Walkman," and MP3 players. The original Walkman device became famous for bringing about a change in the listening of music by allowing people to carry their own choice of music with them. "MP3" originally identified an MPEG standard used especially for digitally transmitting music over the Internet, but has come to mean a file containing a song or other audio data that is encoded using this standard. (The Moving Picture Experts Group or "MPEG" is a working group of ISO/IEC charged with the development of video and audio encoding standards.)

More recently, however, interactive systems have broadened the musical experience. One interactive music system is the SensorBox described by J. Allison and T. Place in their article, "SensorBox: Practical Audio Interface for Gestural Performance," Proceedings of the 2003 Conference on New Interfaces for Musical Expression (NIME-03 (Montreal, Canada). The SensorBox is a system used to input sensor signals into a computer through a digital audio card, with the goal of controlling electronic music performance and composition. Allison and Place describe a method of encoding slowly varying sensor information on audio signals. In order to multiplex the number of sensors they are inputting, carrier waves of different frequencies are used simultaneously, only to be filtered and demodulated by a decoder software. In addition, one of their implementations multiplexes sensor data with real-time musical input. SensorBox is an input device to capture data from gesture-sensors during musical performances to alter sonic parameters within a computer. Thus, it is a tool for a composer rather than a listener. As a performance input device for a computer, SensorBox does not embed the sensor data in an inaudible way.

Another interactive music system was developed by the "Sonic City" project. As disclosed by R. Mazé and L. Gaye in "Sonic City," Proceedings of Cybersonica (2003), the project explores mobile interaction and wearable technology for everyday music creation. The project has designed, implemented, and evaluated a system that creates electronic music based on sensing bodily and environmental factors. Mapping these to the real-time processing of concrete sounds, Sonic City generates a personal soundscape co-produced by physical movement, local activity, and urban ambiance. Encounters, events, architecture, and behaviors—all become ways of interacting with the environment. In this project, the authors' intent is to break out of traditional contexts for music creation to explore creative possibilities within local surroundings and mundane activities. Wearing the Sonic City system, anyone can experience a simple walk down the street as an expressive act and a path through the city as a personal composition. As a complement to lived urban experience, it is an intimate soundscape intended to enhance perception and encourage new uses of the urban landscape.

Thus, Sonic City is a system that is concerned with the connection between the musical experience of listeners (as opposed to a tool for composers) and a multi-sensory environment. Sonic City addresses these details, however, using the environment as input rather than using signals to affect the environment. Like the SensorBox, Sonic City is an input device used to affect composition. The information it uses to generate compositions is the multi-sensory environment of the listener. By sensing light, temperature, the user's movements, and other environmental details, the Sonic City software composes new music on the fly in response to these inputs.

In a press release dated Mar. 9, 2006, Intuitive Devices, Inc. of Los Gatos, Calif. announced an accessory to the popular iPod® device. The iPod® device is a brand of portable media players designed and marketed by Apple Inc. of Cupertino, Calif., and launched in October 2001. As of April 2007, Apple had sold over 100 million units worldwide, making it the best-selling digital audio player series in history. The Blinkit® accessory announced by Intuitive Devices combines a safety blinker with a light beam (akin to a flashlight) and a fun flasher that beats in rhythm to the music played by the iPod® device. The Blinkit® accessory is operated by a single-button, microprocessor-controlled system. The accessory only has a few modes, does not permit selection by the user, has a static functionality, and may be linked solely to the Apple portable media player.

Although the general field of steganography—hiding one signal within another—is large, the subset of the application of steganography to music is much more narrow. Representative of the field of steganography is U.S. Pat. No. 6,947,893, titled "Acoustic Signal Transmission with Insertion Signal for Machine Control" and issued to Iwaki et al. This patent describes an encoding method for embedding a machine control signal in an audio signal that is received and used by an external device. The specific implementation of this technology and its related goals are only peripherally related, however, to music.

Iwaki et al. specifically disclose electrically synthesizing an audible sound signal and another (coding) signal different from the sound signal. A data hiding technique is used under a condition that the auditory presence of the signal cannot be detected by human ears. This signal is emitted from a sound generation device (speaker) to carry out signal output. In perhaps the most relevant application to the present invention, acoustic information (i.e., music) and control signals are transmitted to control sound generation in a robot. Thus, the patent appears to disclose technology used to drive a robot that sings and dances along to a music track.

To overcome the shortcomings of current interactive music systems, the present invention provides a new system. An object of the system is to enrich a listener's musical experience through multi-sensory compositions by providing a method for embedding control data, to drive external devices, within an audio signal in a manner that is compliant with current digital audio standards. A related object is to use digital watermarking or hidden data encoding methods (steganography) to provide a multi-sensory composition in a widely distributed format. Another object is to reintroduce physicality to listening environments using modern technological mechanisms.

It is still another object of the present invention to provide a multi-sensory composition and playback that works within a current audio standard (e.g., the compact disc). An additional object is to combine music listening and the multi-sensory environment in a related and interactive system. Yet another object is to provide an affordable and effective system.

BRIEF SUMMARY OF THE INVENTION

To achieve these and other objects and in view of its purposes, the present invention provides an embodied music system. The system creates an interactive interface between a listener and the external environment. The system includes a physical device located in the environment that provides sensory input to the listener. An audio signal of the system is adapted to be heard by the listener. An encoder embeds inaudible control data into the audio signal. A decoder extracts the control data from the audio signal and transmits the control data to the physical device, thereby controlling operation of the device. Finally, an audio reproduction device is connected to the decoder and plays the audio signal for the listener. The embodied music system allows the listener to experience multi-sensory compositions.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 6A shows that an eighth-order elliptic filter successfully removes the music, leaving the code;

FIG. 6B shows that, after discrimination, the code itself is represented as a DC term;

DETAILED DESCRIPTION OF THE INVENTION

Figure 1:
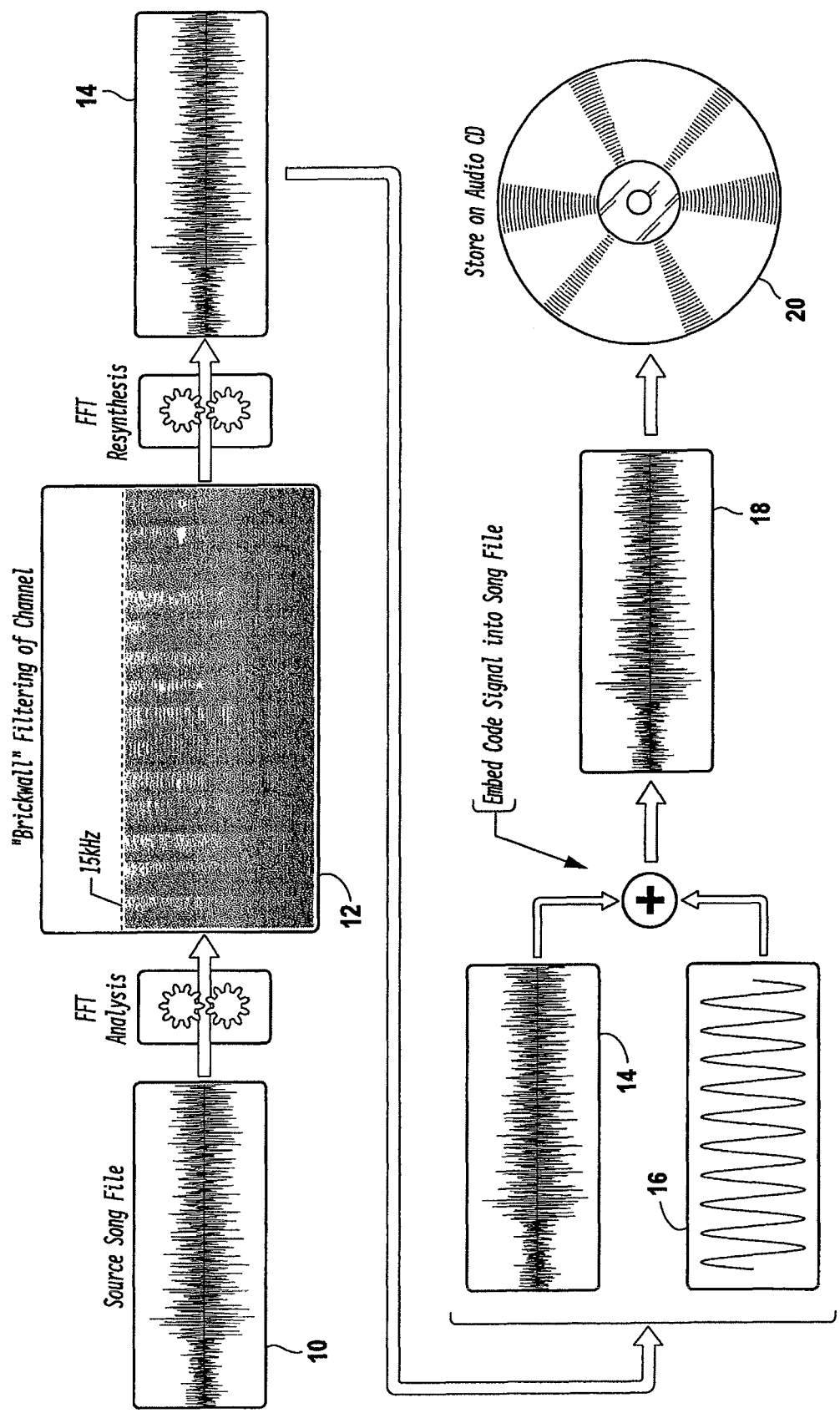
FIG. 1 illustrates the steps used to encode a signal according to one embodiment of the embodied music system.

If it is the case that the experience of our environment occurs through all of the senses equally, then it is understandable why an incongruity between the various senses can cause a desire to disassociate from the environment in which we exist. It is common to "block out" or ignore all of our other senses in order to focus on the particular modality most directly related to the task at hand. The ability to create cohesive sensory experiences will cause us to become more engaged in our world and provide a far deeper emotional attachment to our activities and interactions. Furthermore, if it were possible to capture and synthesize ideal multi-sensory environments, such moments of true engagement could be dynamically re-creatable.

The embodied music system of the present invention takes advantage of the premise that new musical systems are the ideal mediators for these future multi-sensory environments. Music enjoys widespread standardization; familiar interfaces; and a current, pervasive role in our everyday lives as a mood modifier. By "embodied" is meant that music is caused by the system to become material or sensuous and a part of the system or whole.

The embodied music system is a form of music interface based on an encoder-decoder system that allows composers to embed codes in the CD audio stream or signal in a way that is unnoticeable to the human ear. The codes are extracted by the listener using an embodied music decoder, which connects to the headphone jack of any CD player (or alternatively, sound reproduction devices in all types of electronic components including a personal computer, karaoke player, radio, television, tape deck, video deck, MD player, CD player, DVD player, analogue record player, DAT deck, MP3 player, or the like). These codes are then used to control physical systems in the listening space to provide a fuller sensory experience.

Thus, the embodied music system according to the present invention incorporates the techniques of audio hidden data encoding methods (steganography) or digital watermarking. The system uses digital watermarking or steganography to embed control data or codes within an audio signal. The control data drive external devices to expand the listening experience of a music composition. The system can derive power from any suitable source, such as batteries or the other devices which the system engages.

By working within the compact disc (CD) audio standard, the embodied music system is able to be passive and ignored or, through the use of a simple decoder, exploited for all manners of multi-sensory control. In addition, the size of the system fits neatly within a dual CD jewel case, making it a system that can be sold easily in the same venues as other music products. The use of steganography in audio is most common for copy protection and exists largely in the digital domain. In contrast to this use, the embodied music system incorporates a steganography technique to expand the listening experience of a piece of music in an everyday setting using a conventional CD player.

In general, the signal developed by the embodied music system contains both music recording and other sensory controllers such as light, smell, taste, touch, or thermal attributes of a space. In each case, a method of encoding and decoding control data in the audio file is provided. An embodied music system CD behaves like a conventional CD and is compatible with all standard players. To extract the codes of the system, a decoder is connected to the CD player headphone jack allowing the listener to experience multi-sensory compositions.

The external devices controlled by the embodied music system, such as lights, physical surfaces, thermal controls, smell or taste generators, and the like, typically must respond to 8-bit digital words. The data used to control these devices are embedded in an audio signal in a way that is below the level of perception for the listener yet is accurately extracted by the decoder. To render the decoder of the system compatible with conventional CD players, the data must be embedded in the audio stream itself. The decoder is small, light in weight, and relatively inexpensive so that the component can be mass-produced. A hybrid analog-digital system is one embodiment of the embodied music system.

High frequency temporal coding (HFTC) is a method of encoding data in an audio stream using a high-frequency carrier signal. HFTC is defined generally as a method that transmits a hidden signal within an audio signal by exploiting the auditory insensitivity of human beings to small phase differences between two signals, one presented to each ear. Each of the embedded carrier signals is transmitted at constant and low amplitude. When embedded in an audio file at a sufficiently small amplitude, the encoded data cannot be perceived by listeners. The lack of perception results from the frequency-dependence of the human auditory system's sensitivity to sound.

As stated above, a high-frequency carrier signal is added to the audio signal. The high-frequency carrier signal has a carrier frequency that is limited, generally, by the upper-bounds of the digital audio encoding system and by the lower-bounds of the human ear's insensitivity to high-frequency audio content. More specifically, the frequency of the high-frequency carrier signal is in the range limited by the upper-bounds of the digital audio encoding system and by the lower-bounds at 17.5 kHz. Most specifically, the frequency of the high-frequency carrier signal is about 18 kHz and the high-frequency carrier signal is added to the audio signal in a manner that is compliant with current digital audio standards.

Referring now to the drawing, FIG. 1 shows the steps to encode an HFTC signal. First, a Fast Fourier Transform (FFT) analysis of the music or source song file 10 is computed. Second, a frequency-domain "brickwall" filter is used to clear all frequencies above 15 kHz, which can be accomplished by zeroing the Fourier coefficients, to yield a filtered file 12. Third, FFT re-synthesis returns the file to a time-domain signal yielding returned file 14. Fourth, the code 16, modulated onto an 18 kHz sine wave, is summed with the returned file 14. Fifth, the resultant sound file 18 is recorded or stored onto an audio CD 20.

A single byte of data is represented as a temporal code, meaning that the duration of the code corresponds to its value. A value of x is represented by a pulse of duration $T(x+1)$, where T is the shortest code length. Therefore, a value of 1 is represented as a pulse of duration 2T and a value of 15 is represented by 16T. In order to account for all 256 values of an 8-bit word, two "nibbles" that can vary between 0 and 15 are sent for each byte, the second nibble shifted by four to achieve the four most significant bits.

A portion of the 256 values may be generic, pre-defined commands such as go, stop, on, off, etc. that are not device-specific. The remaining commands are then available for customization per device. Each audio stream may be encoded to include a start command then a device-identifier command (either generic or specific). This allows manufacturers to have maximum flexibility in customizing their device response. An end command marks the end of a song. If the end command is not received, the next start command will reset the device.

A. Amplitude Modulation

A first embodiment of the embodied music system uses amplitude modulation of a carrier wave "multiplexed" with a music signal. The embodied music system embeds control data in the music signal to be stored on a CD or other device capable of playing music. The music listener uses the music-playing device to drive external, multi-sensory devices in time with the music. Importantly, the embodied music system embeds the sensor control data in an inaudible way.

Figure 2A:
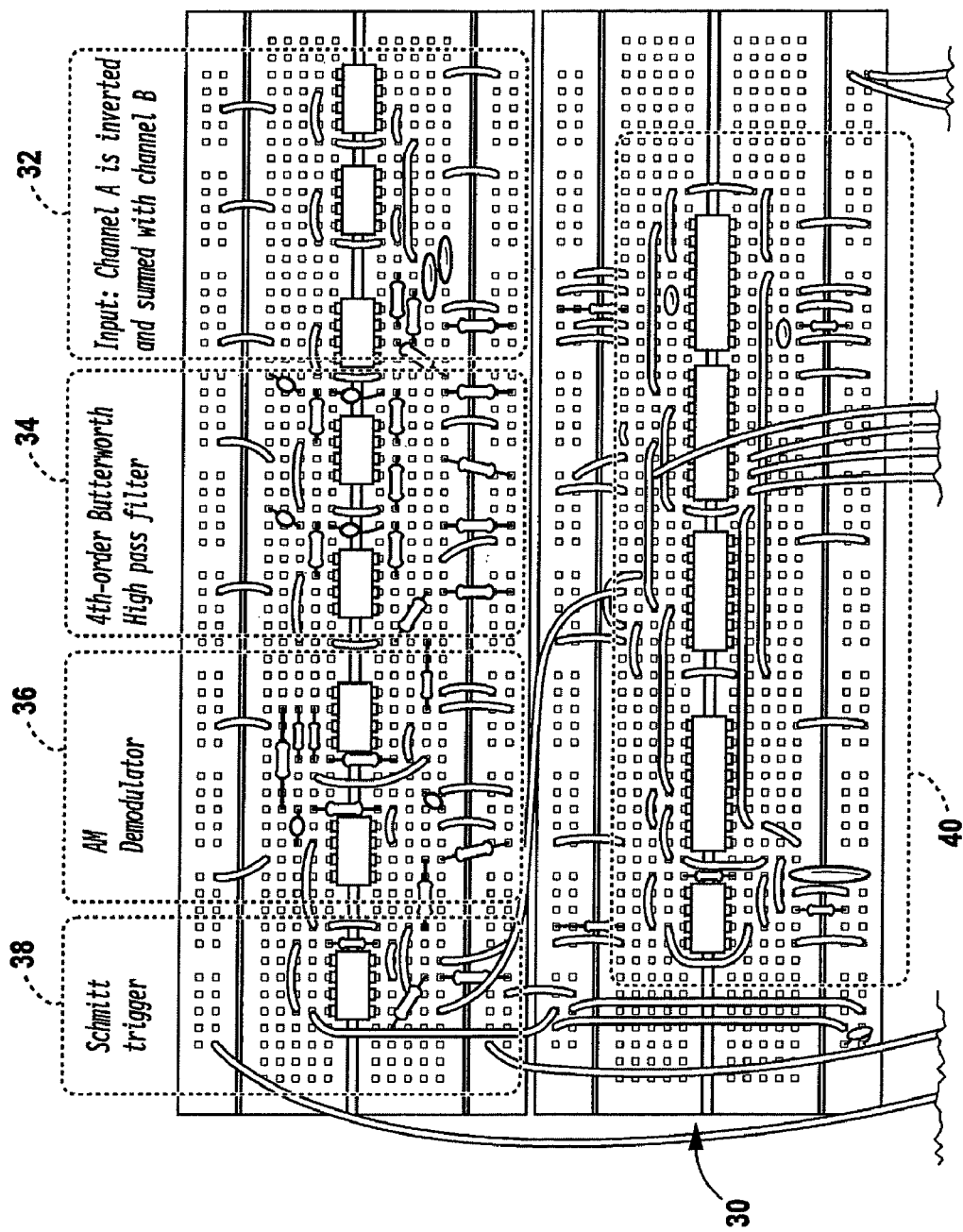
FIG. 2A illustrates a high frequency temporal coding (HFTC) decoder of an embodiment of the embodied music system using an amplitude modulation scheme.
Figure 2B:
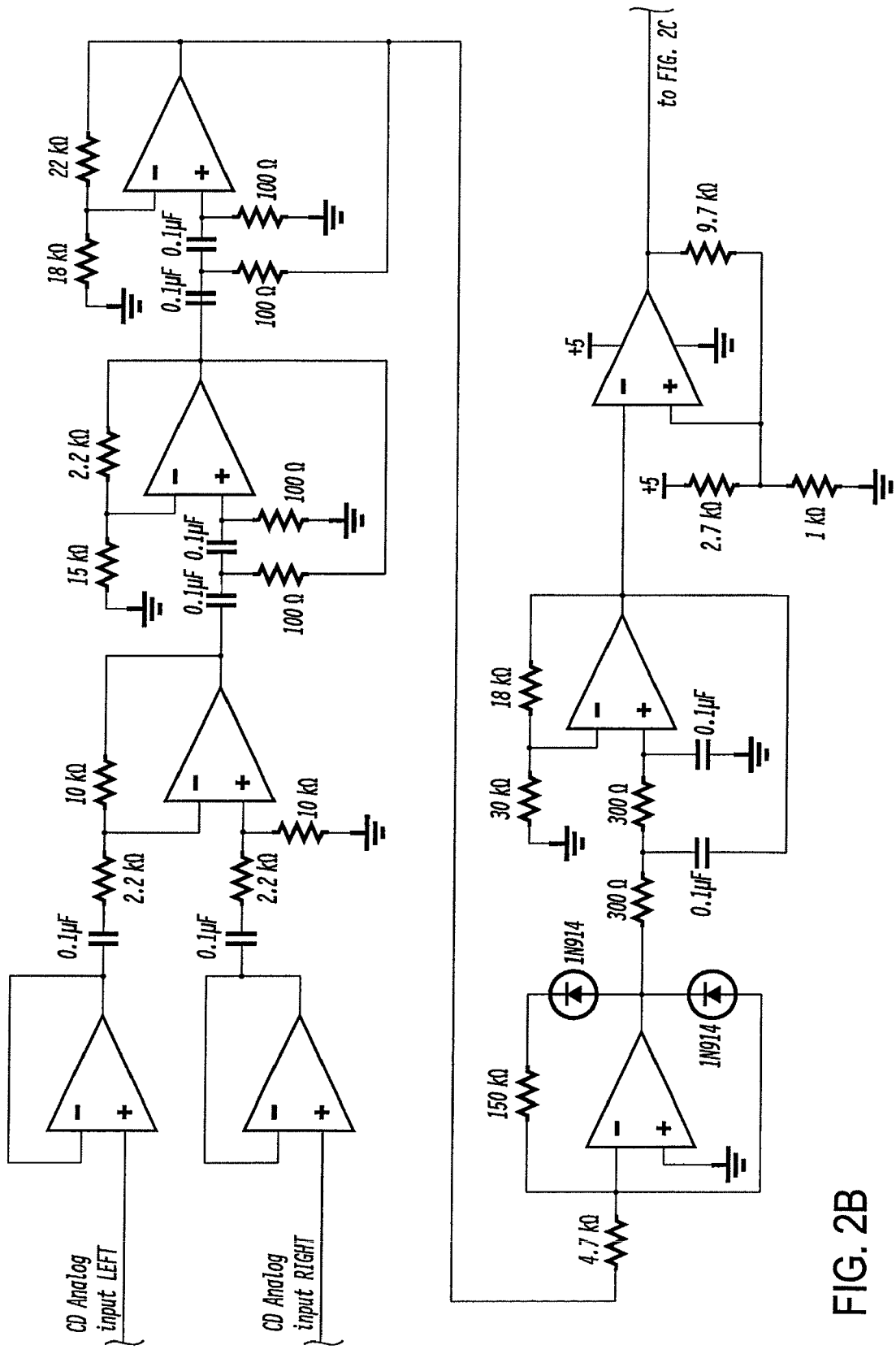
FIG. 2B is a circuit diagram of the prototype HFTC decoder analog section illustrated in FIG. 2A.
Figure 2C:
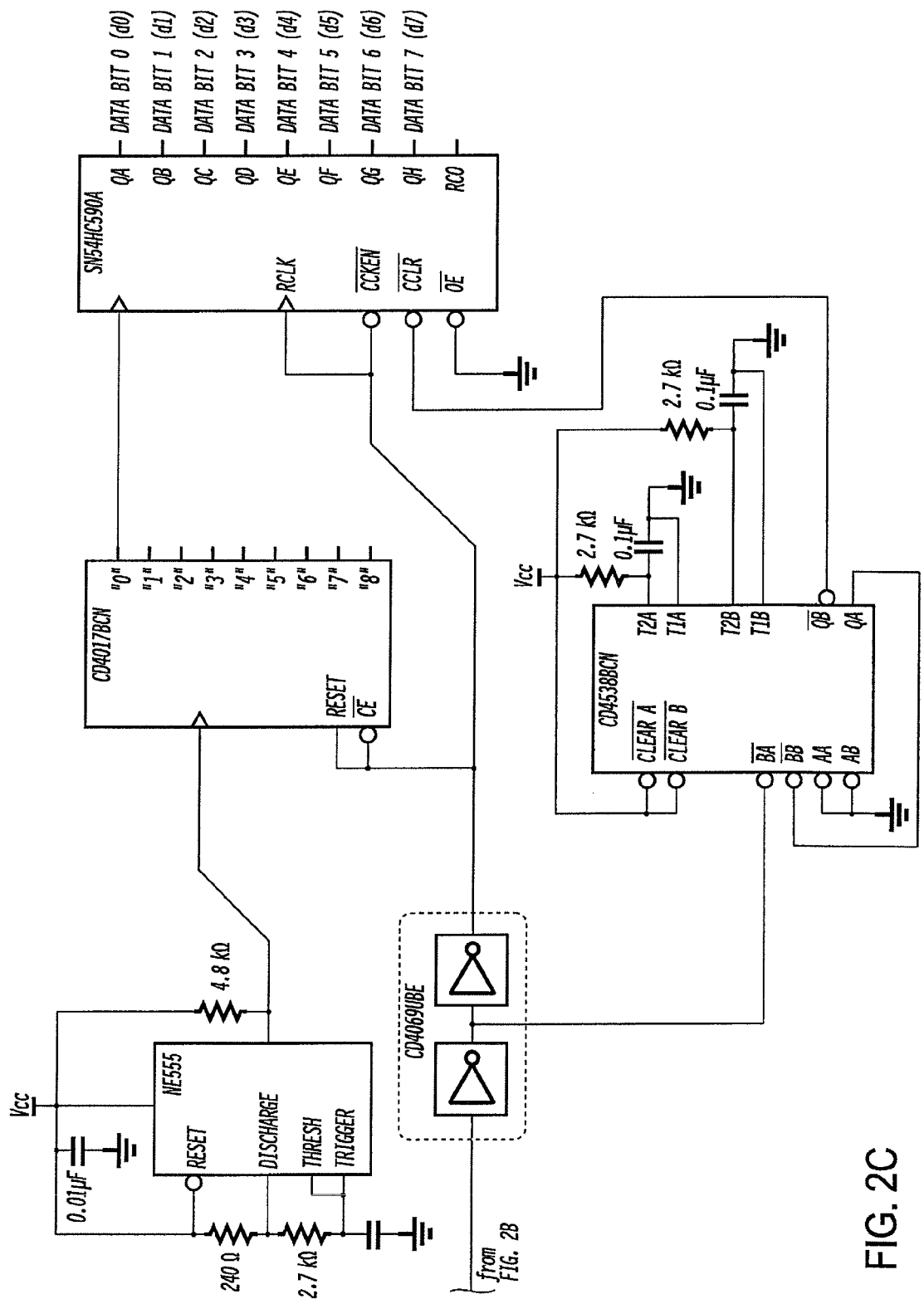
FIG. 2C is a circuit diagram of the prototype HFTC decoder digital section illustrated in FIG. 2A.

To highlight coding and decoding implementations, a fully operational, 4-bit prototype of the embodiment of the embodied music system was built using an amplitude modulation scheme where the code directly affected the amplitude of the carrier wave. FIG. 2A illustrates the prototype of the HFTC decoder 30 using an amplitude modulation-demodulation scheme. FIG. 2B is a circuit diagram of the prototype HFTC decoder analog section illustrated in FIG. 2A; FIG. 2C is a circuit diagram of the prototype HFTC decoder digital section illustrated in FIG. 2A.

Identical copies of the code were placed out-of-phase in both the left and right channels of the audio signal, thus resulting in a common-mode-rejection signal. By buffering the input then inverting and summing the codes in the decoder, a large amount of noise was cancelled, as well as any audio information common to both channels, in a first section 32 of the decoder 30. The signal was then passed through a fourth-order, Butterworth, high-pass filter 34, used to remove any signals below 15 kHz and leave only the code at 18 kHz. This signal was then demodulated using an active rectifier and a second-order low-pass filter in a third section 36 of the decoder 30. Finally, the code signal was scaled to transistortransistor logic (TTL) levels using a Schmitt trigger 38 before being sent to the digital decoding section 40. (TTL is a common type of digital circuit in which the output is derived from two transistors; the term TTL is commonly used to describe any system based on digital circuitry.) The digital decoding section 40 uses a combination of a timer and counter to measure the width of the pulse and thus calculates the digital value of the code.

B. Inter-Signal Discrimination

Figure 3:
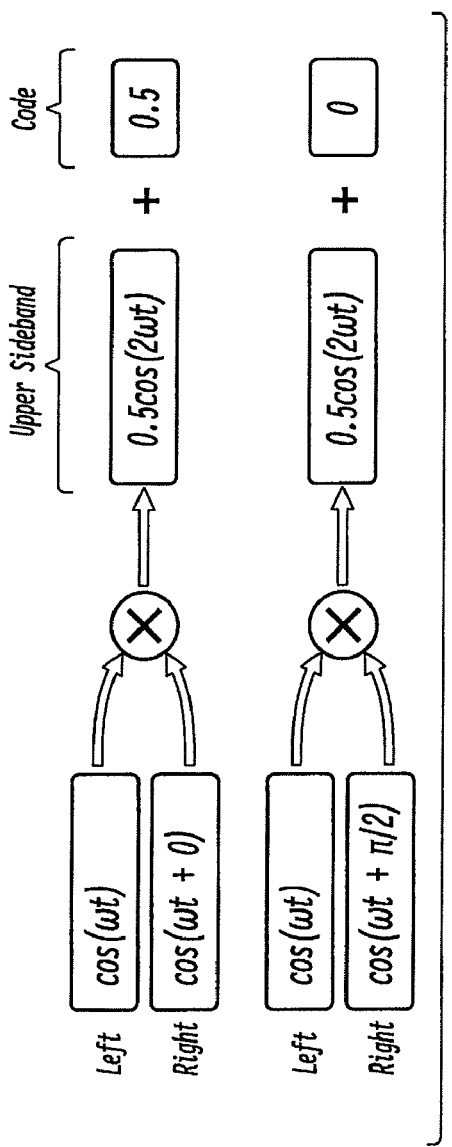
FIG. 3 illustrates an alternative embodiment of the embodied music system using an inter-signal discrimination scheme.

The amplitude modulation scheme can be sensitive to noise because it is stored at very low levels. Therefore, an alternative embodiment of the embodied music system adopts a more robust inter-signal discrimination scheme. Inter-signal discrimination encoding is shown in FIG. 3. Studies so far have shown that the signal can be stored at much larger amplitudes without being heard, thus overcoming noise.

Figure 4:
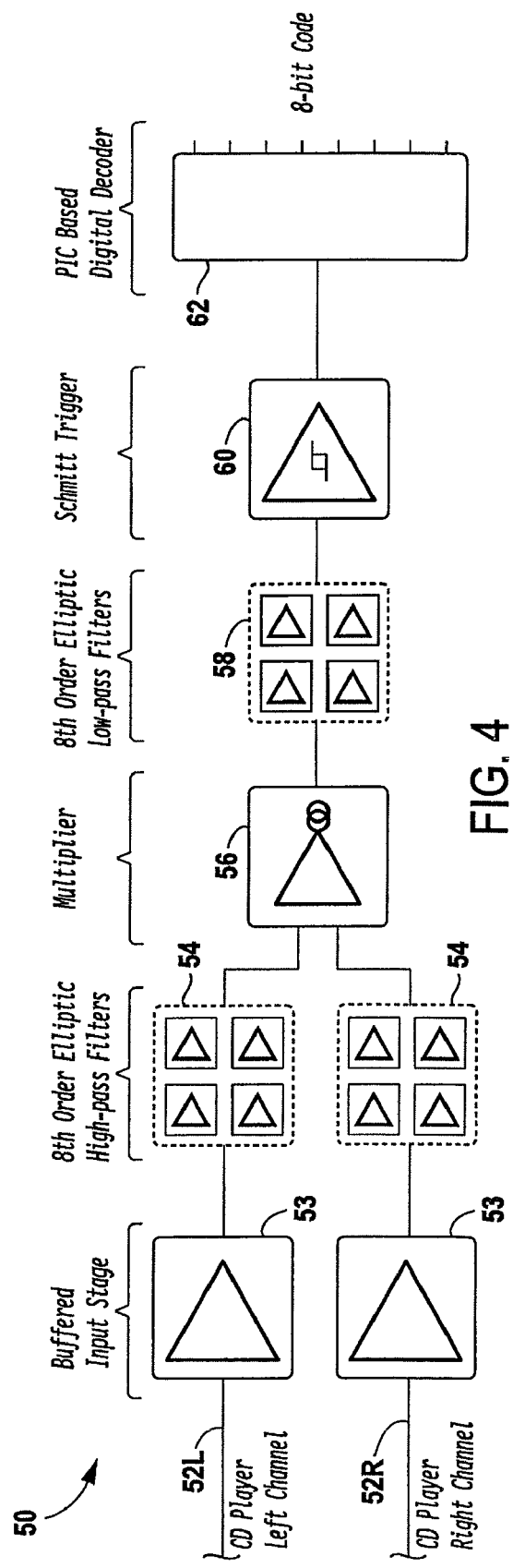
FIG. 4 illustrates a decoder of an embodiment of the embodied music system using an inter-signal discrimination scheme.

In order to implement this embodiment, an alternative decoder 50 is necessary. As shown in FIG. 4, the single, fourth-order, high-pass filter 34 of the amplitude modulation scheme is replaced by two, eighth-order, elliptic, high-pass filters 54. Each one of the two filters 54 is identified with a separate channel (left 52L or right 52R) of the CD player. Each of the left and right signals is buffered at a buffered input stage 53. After passing through the filters 54, the signals are then multiplied (at a multiplier 56) and filtered (at an eighth-order, elliptic, low-pass filter 58) to extract the code, before being sent to the Schmitt trigger 60. The discrete components of the digital section are replaced by a single programmable integrated circuit (PIC) chip 62 that allows for a more compact design and better timing resolution.

Matlab is a commercial "Matrix Laboratory" software package that operates as a programming environment. It is a mainstay of any collegiate engineering department software lineup and is available for all computer operating systems. Matlab is well adapted to numerical experiments because the underlying algorithms for Matlab's built-in functions and supplied m-files are based on the standard libraries UNPACK and EISPACK.

Figure 5:
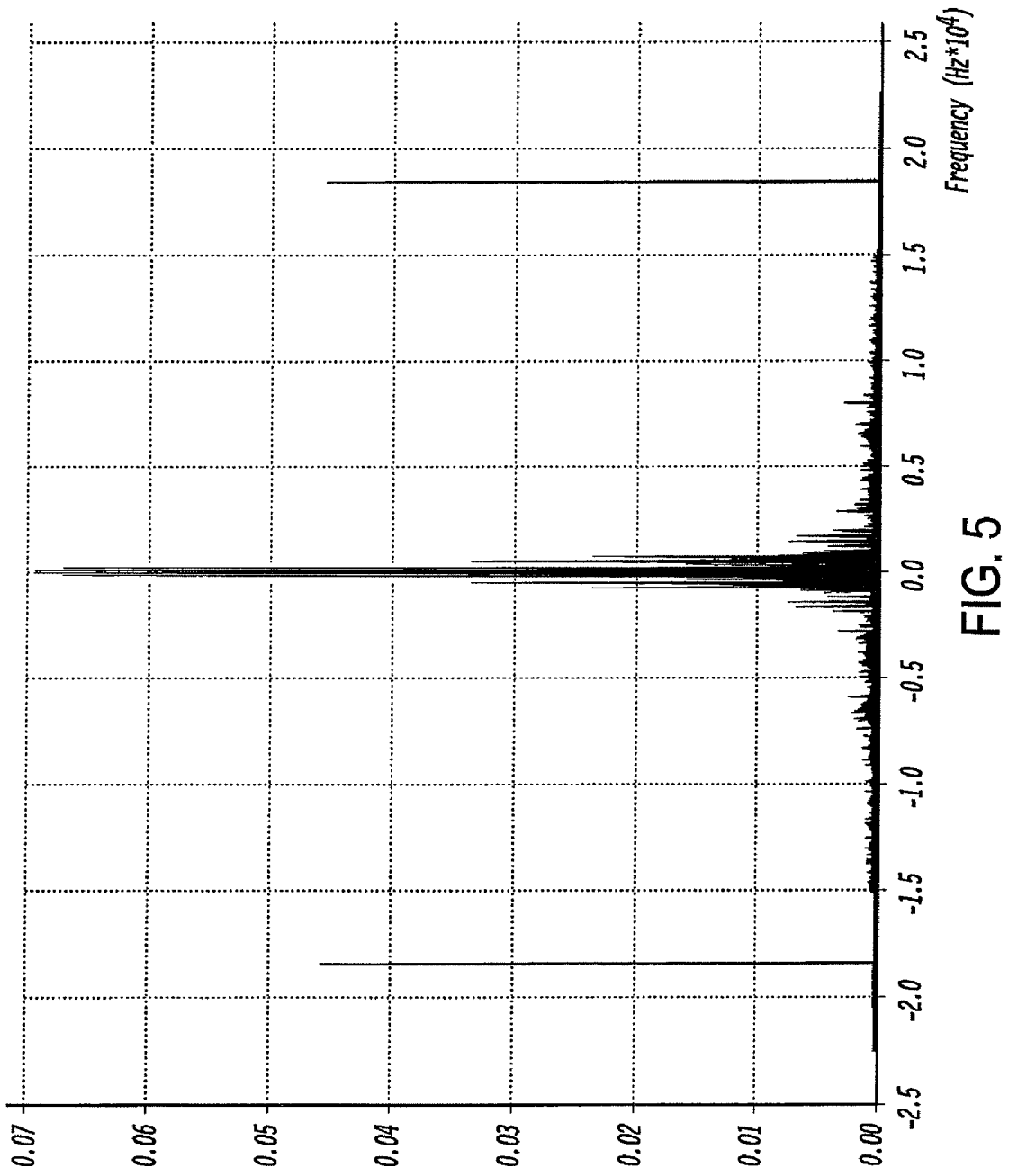
FIG. 5 illustrates a frequency spectrum of a first second of a song with embedded code, clearly shown at 18 kHz.
Figure 7:
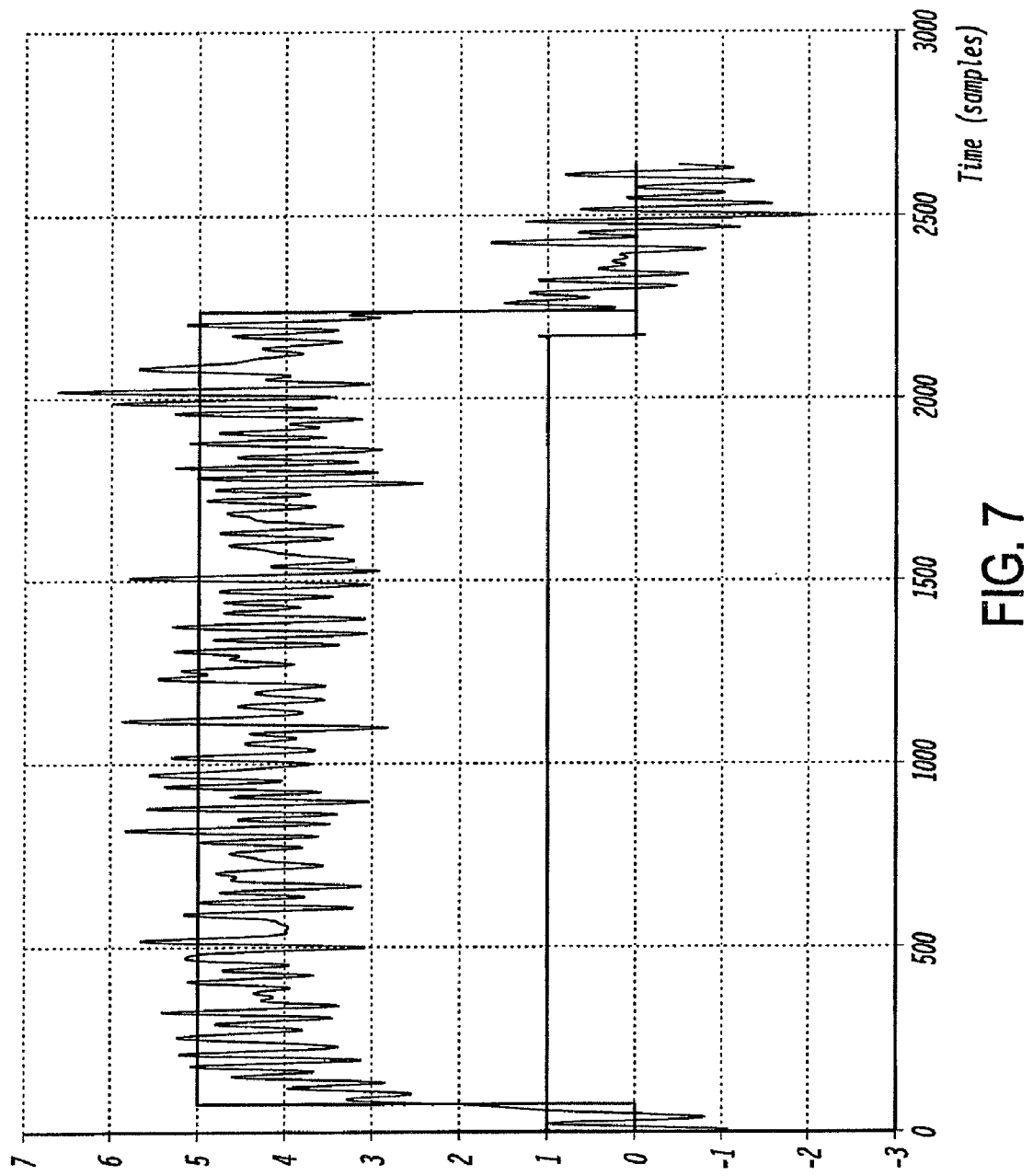
FIG. 7 shows the time-domain representation of the code.

A Matlab simulation was completed and successfully extracted the inter-signal discriminated codes from the audio files. FIGS. 5-7 illustrate some of the details of this simulation. Specifically, FIG. 5 illustrates a frequency spectrum of a first second of a song with embedded code, clearly shown at 18 kHz. FIG. 6A shows that an eighth-order elliptic filter successfully removes the music, leaving the code. FIG. 6B shows that, after discrimination, the code itself is represented as a DC term. FIG. 7 shows the time-domain representation of the code. The "noisy" signal is the code before the Schmitt trigger. The sharp, square signal is the code after the Schmitt trigger. Noteworthy is that the noise was added artificially to the code to test the robustness of the Schmitt trigger. A 5% Gaussian noise mixer was used.

C. Example Operation

The embodied music system is a tool that allows composers to place control data within a music signal that is used to create multi-sensory listening environments. The control data are inaudible and are placed in the audio signal itself before the audio signal is recorded to a CD. Discs that have embodied music audio work normally in any standard CD player and can be treated as such. If a listener chooses to engage in a multi-sensory environment, an embodied music decoder is placed in the CD player's headphone jack and the codes are extracted. These codes can be used to control any device that is equipped to receive embodied music data. These devices can range from special lighting, scent or sound delivery devices, furniture (e.g., a heater in a chair or couch), mechanical musical instruments, or even kinetic sculptures. The embodied music system is not just a single device but a concept that can be applied to any device in a listener's environment.

Figure 8:
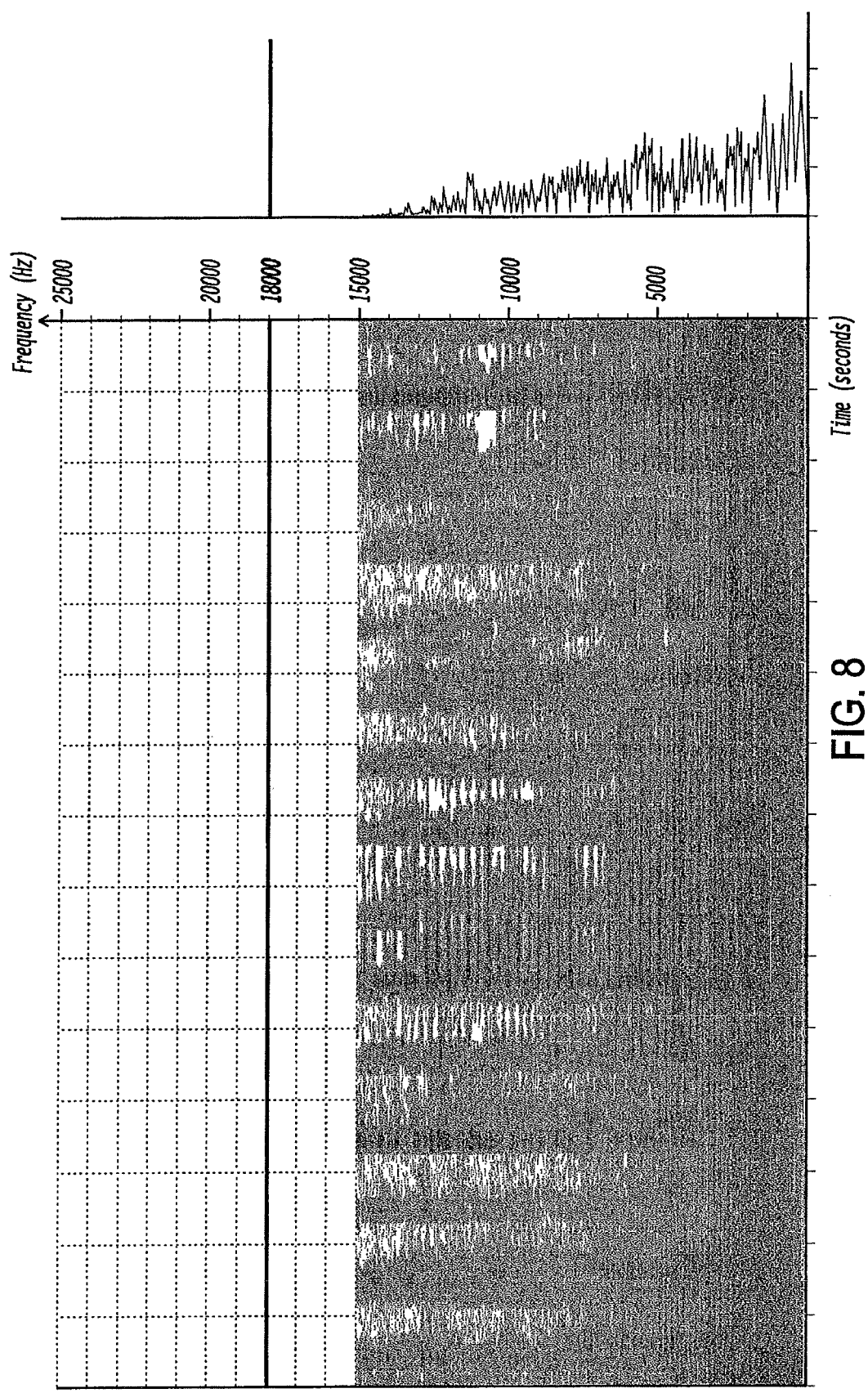
FIG. 8 illustrates the sonogram of a song with embedded code according to an exemplary embodiment of the embedded music system.
Figure 9:
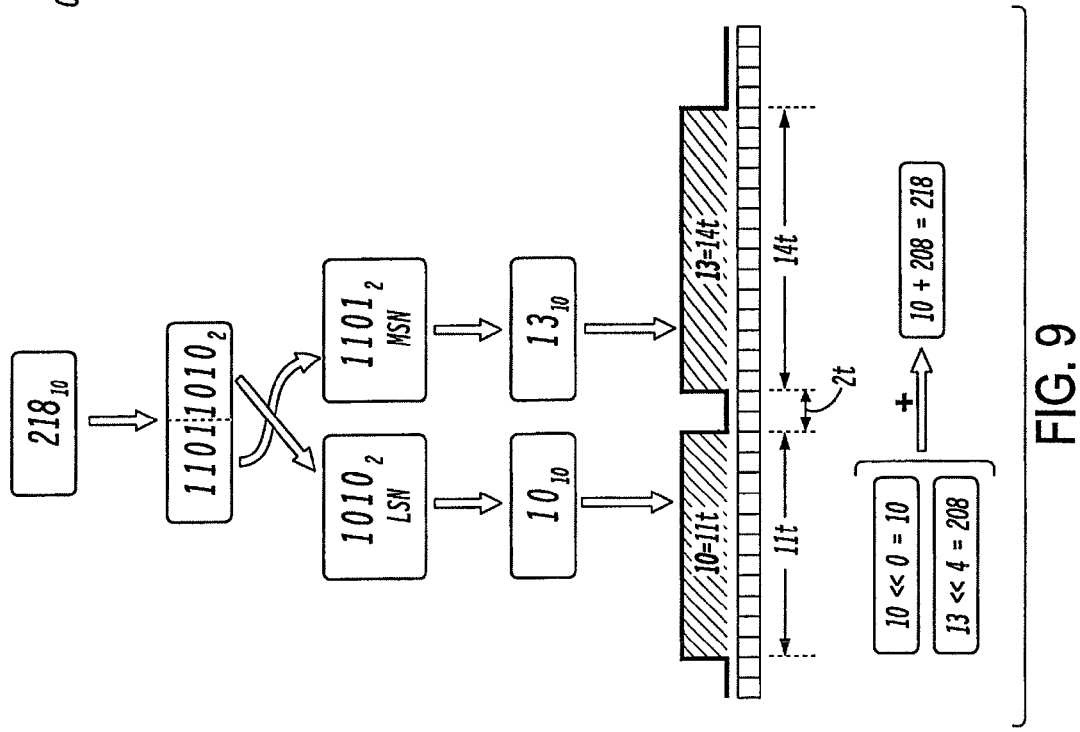
FIG. 9 illustrates a simple example of encoding the number 218 into a pulse code.

In an exemplary embodiment, the embodied music system works as follows. Using embodied music system software, a composer inputs an audio file and a series of codes to embed in the file. FIG. 8 illustrates the sonogram of a song with embedded code. The audio is converted to the frequency domain using a Fast Fourier Transform. All coefficients above 15 kHz are set to zero resulting in a clean, high-frequency channel in the audio spectrum. The audio is converted back to a time-domain signal. The codes are used to modulate the phase of a low-amplitude, stereo, 18 kHz carrier signal which is added to the audio signal. Decimal numbers are represented by a pulse code, where the duration of the pulse corresponds to its value between 0 and 15. FIG. 9 illustrates a simple example of encoding the number 218 into a pulse code.

Figure 10:
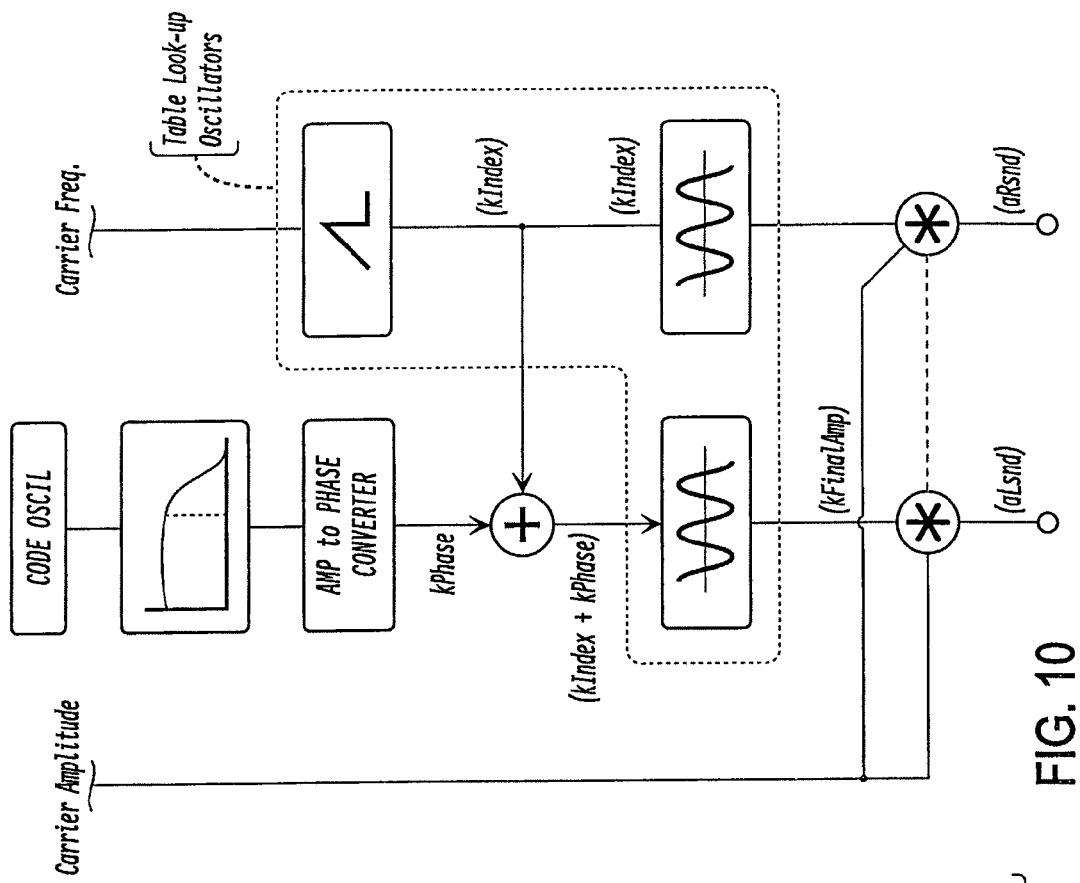
FIG. 10 provides a block diagram of carrier phase discrimination.

The pulse varies the relative phase between the two channels of the 18 kHz signal. The amplitude of this carrier wave allows it to remain inaudible to human ears in normal listening settings due to the non-uniform frequency sensitivity of the auditory system. In addition, modulating the phase of the carrier wave results in no audible artifacts due to the ear's relative insensitivity to phase differences. FIG. 10 provides a block diagram of the carrier phase modulation. The encoded audio signal can then be used on any digital playback system.

Thus, in one alternative, as illustrated in FIG. 9, the bytes of the code words are split into four-bit nibbles, each converted back to decimal, and the decimal values represent the duration of a short pulse. The receiver recovers the original bytes by measuring the duration of each pulse and reassembling the full byte from the separated four-bit nibbles. In another alternative, illustrated in FIG. 10, the phase difference between the two carrier signals is determined by the amplitude of the original modulating signal (i.e., the code). The receiver reconstructs the hidden signal by adding the two carrier signals together. The constructive and destructive interference that results from their addition results in the original code signal. These two alternatives may be combined.

Figure 11:
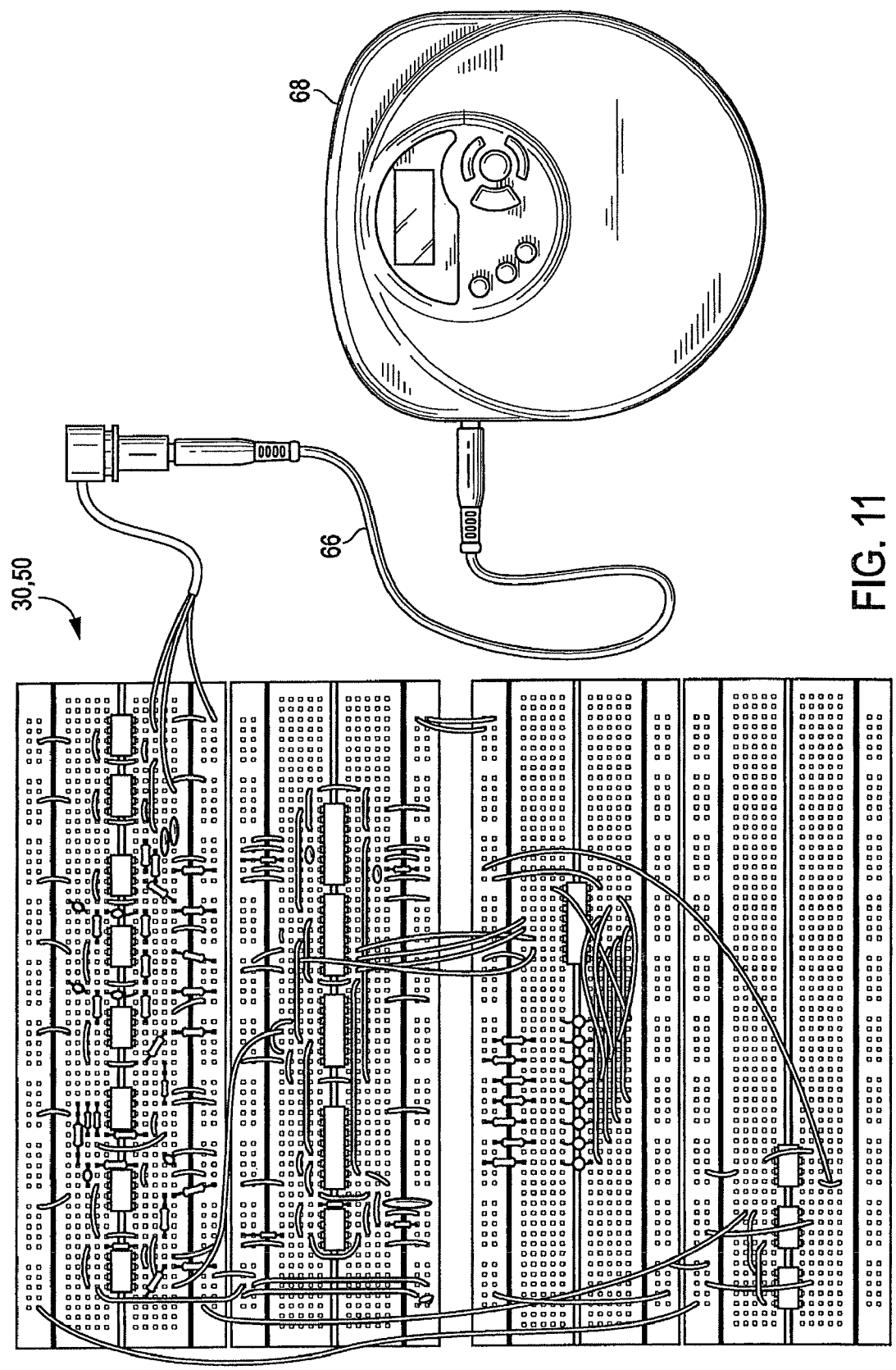
FIG. 11 shows connection of the decoder of the embodied music system to the headphone jack of a CD to extract codes.

To extract the codes, a listener connects the decoder 30, 50 of the embodied music system to the headphone jack 66 of a CD player 68 as shown in FIG. 11. As described above, one example decoder has an analog demodulator section and a digital decoding section. The codes are demodulated by filtering out the music signals (elliptic high-pass filter) leaving only the carrier wave. The two channels are then multiplied together (balanced modulator). Finally, the resultant upper-sideband is removed (elliptic low-pass filter) leaving the pulse code. The digital section of the decoder includes a timer-counter pair and is triggered by the pulse code thus reconstructing the decimal number.

Figure 11A:
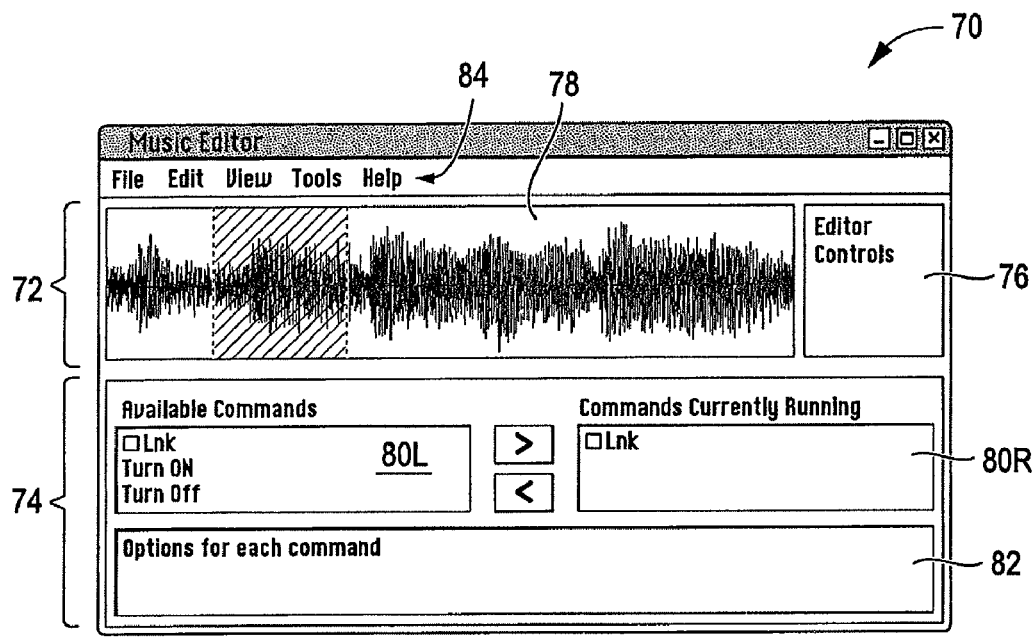
FIG. 11A illustrates one example of a user-friendly graphical user interface for the embodied music system.

In an exemplary embodiment, the embodied music system includes a user-friendly graphical user interface (GUI) 70 such as that illustrated in FIG. 11A. The interface 70 has a first section 72 defining the audio editor and a second section 74 containing the tools that are unique only to the music editor. The interface 70 allows the user to play a song while providing a visual representation of when various commands are occurring. This representation, in turn, allows the user to verify that the commands were inserted where they were intended or to modify the commands. Custom commands for new devices can be loaded as an add-in and can then be available for insertion into audio streams.

The audio editor of section 72 allows a user to open audio files. A horizontal graph shows a time-space representation of the song in a wave display 78. The box 76 titled "Editor Controls" to the right of the wave display 78 is a placeholder for the controls that allow the user: (1) move from point to point in the audio stream, (2) cut, (3) copy, (4) paste, and (5) apply a filter. Although this list is not exhaustive, it highlights the main functionality of the audio editor.

The second section 74 of the interface 70 allows the user to choose from standard commands (turn on, turn off, go, stop, blink, fade, etc.) from a drop-down menu and insert them into the song at a time chosen by the user. The list box 80L on the left contains all the valid commands that can be used at the current time in the audio stream. The list box 80R on the right contains the commands that are running at the current time in the audio stream. Because each command can be customized, the box 82 titled "Options for Each Command" at the bottom of the second section 74 of the interface 70 contains the customizable attributes of the currently highlighted command. Once the user has encoded the music file with a choice of commands, the user can operate the toolbar 84 at the top of the interface 70 to save the music file to be, for example, either burned to a CD or copied to a personal music player.

D. Example Applications

In one application, the embodied music system can be used by musicians to embed codes in their music to control physical, sensory devices in a listening environment. The controlled devices add to the experience of the listener. Two specific implementations use the embodied music system to control (1) a mechanical musical instrument that performs live with the music, and (2) a scent delivery device.

Figure 12:
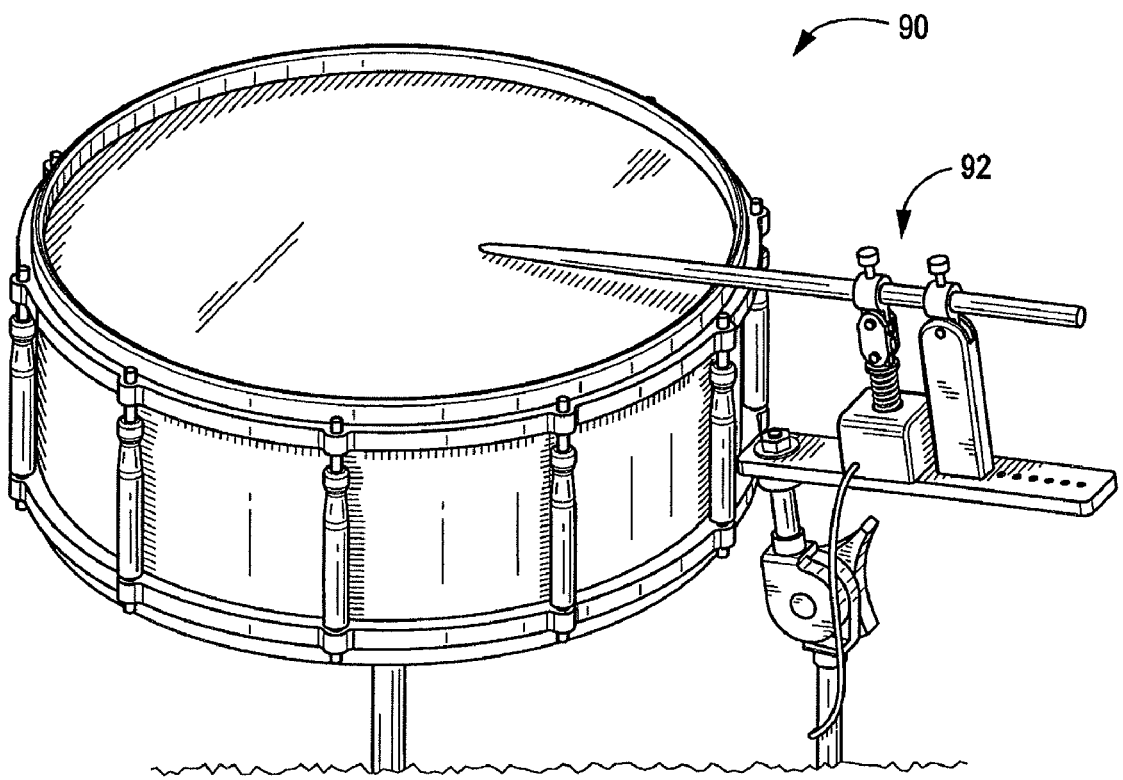
FIG. 12 illustrates a decoder-automatic drum set that plays along to embodied music codes embedded in a CD when attached to the headphone jack of a player.

As a proof-of-concept for the embodied music system, a working prototype was developed of a decoder-automatic (or robotic) drum set that played along to embodied music codes embedded in a conventional CD when attached to the headphone jack of a conventional CD player. FIG. 12 illustrates the drum set 90 with a custom-designed drum mechanism 92. A wide variety of mechanical instruments can be controlled with the embodied music system. These instruments could be small novelties for use in the home or larger and more complex for use in public spaces as a spectacle.

Scent-generation systems have been developed and marketed in the past (the Smell-O-Vision system was used for the film "Scent Of A Mystery") with very limited success. System costs have been high, most systems deliver only one or very few scents, and the costs increase directly with the number of possible scents delivered. Multiple companies are currently developing scent generators.

Figure 13:
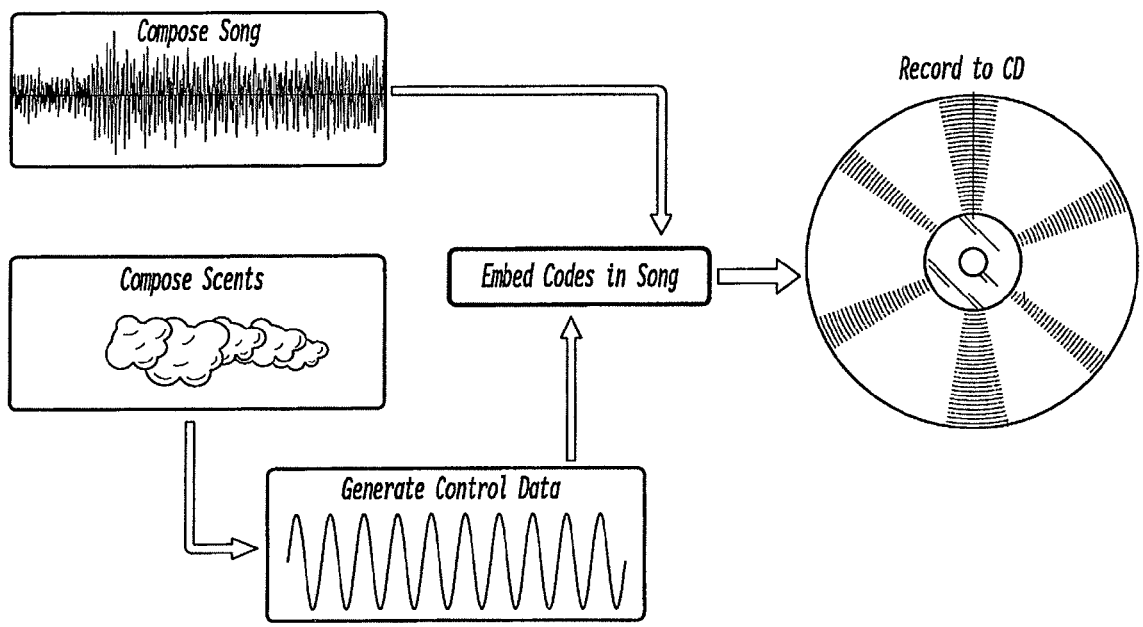
FIG. 13 provides an overview of the encoding process for a scent application of the embodied music system.
Figure 14:
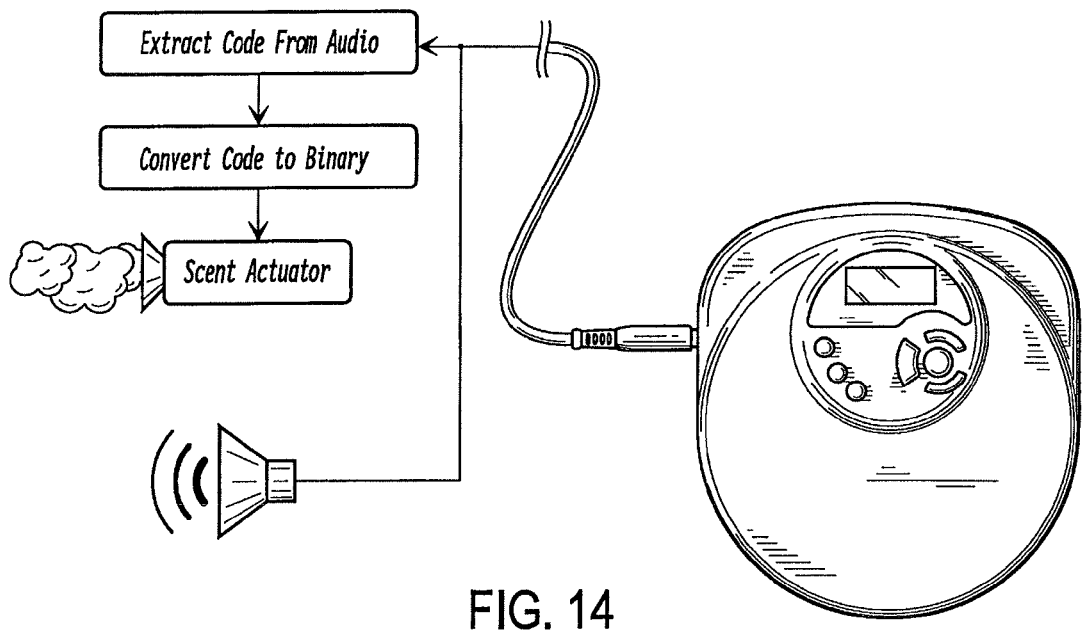
FIG. 14 provides a simple overview of an embodied music scent device.

In the implementation directed to a scent delivery device, the embodied music system is used to control scent in the environment of the listener. In operation, a composer embeds codes that drive an external, digitally controlled scent delivery device, which contains a library of different smells. FIG. 13 provides an overview of the encoding process for the scent application. The decoder and scent delivery device reside inside a dual CD jewel case and might be sold in locations where people normally buy music. A music listener can use the CD normally or, when desired, plug the decoder into their headphone jack and generate smells in time with the music. FIG. 14 provides a simple overview of the embodied music scent device.

These two example applications suggest control capabilities for a wide variety of sensory devices beyond live music and smell. These include, but are not limited to lighting, temperature, furniture geometry, and kinetic sculptures. For example, a heater in furniture could be activated to warm the furniture when "hot" music is played. Using the embodied music system, a kinetic architecture can reconfigure itself based on the social use of the space (mediated by music). The embodied music system can interact with a wide variety of external devices to create adaptable, multi-sensory environments mediated by music listening.

Further applications of the embodied music system are possible by incorporating existing technology. Given the rise of MP3s and portable MP3 players, it is desirable to operate the embodied music system within the MP3 standard. Similarly, the embodied music system can transmit its codes to surrounding devices using BlueTooth technology such that any devices in the vicinity of the system can respond to the codes of the embodied music system. Bluetooth is an industrial specification for wireless personal area networks (PANS). Bluetooth provides a way to connect and exchange information between devices like personal digital assistants (PDAs), mobile phones, laptops, PCs, printers, and digital cameras via a secure, low-cost, globally available short range radio frequency.

The embodied music system can be incorporated into accessories for MP3 players and other audio devices. This is a large market, with existing entries such as silicon iPod® cases, decorative covers, base systems with integrated speakers, etc. Any of these can be enhanced with the embodied music system. For example, visual (LED) enhancement, when added to these products, could lead to products such as a color-shifting MP3 case or a docking base with multiple LEDs.

The embodied music system can be incorporated into control system 120 VAC devices. This product could be connected between selected 120 VAC devices and an electric wall outlet, and control the response of the device by modulating power. This can be used by bars, small clubs, and after-hours venues to provide a cohesive sensory environment driven by the music selection without purchasing new, expensive equipment or requiring oversight. In the simplest case, the lighting of the venue could be connected to the control system thus allowing the lights to be faded, pulsed, and choreographed in response to the system commands. The control of 120 VAC devices by modulating power can be extrapolated to many different devices and environments, including an individual home. In this application, users can control devices that they may already own.

In another application, the embodied music system can be incorporated into a remote, ambient awareness system. While one person is listening to music, they may choose to transmit the system commands to a friend, who may not be in an environment conducive to music listening. This application may take the form of a wearable device or a wireless trinket that sits in the pocket. The first user is listening to music with embedded codes. She may choose to send the music to the device—connected through the Internet—of a friend. The second user keeps the wifi-enabled device in his pocket. The device could thump, pulse, massage, and generate heat based on the transmitted commands. Although two or a group of people might not be in the same location, they would be able to communicate their presence, activities, and mood in an unobtrusive manner, simply through their music selections.

In another application, the embodied music system can be incorporated into a personal bass system. A wearable armband or chest band is combined with a device that translates bass into motion (pulsations) to allow the user to "feel" the music. This product would limit the experience to the user unlike the alternative of simply increasing the volume, which often also produces unwanted distortion of the bass and other frequencies. This product would also be beneficial to users with hearing disabilities who have been known to enjoy music through bodily vibrations.

In another application, the embodied music system can work in reverse as an automatic disc jockey or DJ. This application would require the development of software that over time builds up an association between embedded system commands and how the user configures their environment (e.g., lighting, background noise, temperature). Using simple environmental sensors—for instance, a laptop camera, microphone, and thermal sensor—the software could choose songs in response to the current state of the listening space. Thus, the embodied music codes could acquire an adaptive and personally determined role through new musical environment associations.

In yet another application, the embodied music system can form part of a relaxation or meditation scheme. The overall product might include a combination of soothing light, scent, sound, and massage. The product could be mounted on a hat or visor, perhaps providing light and scent only. A full-function product might be made part of a high fidelity chair or recliner, in which the embodied music system could be used to control lights, visceral bass response, heat, massage, or any combination of these aspects.

Once a user has created a customized song, the user can save the customized song. In addition, the user can save just the command stream to a file and share that file with other users who could then open the file and embed it into their legal copy of the song. This process allows users to share customization files without illegally sharing the songs as well. The embodied music system could also have an output jack to allow multiple systems to be connected together, creating a "string" of devices. This connection would allow users to chain their devices together if desired for use in dorm rooms, at parties, etc.

An Internet (online) community could develop of people who use the embodied music system to embed their codes into their music. In such a community, people with the same sensory devices could share their "sensory compositions" of favorite songs online Thus, multiple listeners could combine to create a group-wide interactive music experience by using the embodied music system.

The embodiments disclosed above highlight an "open loop" version of the embodied music system: data embedded in the music signal control external devices in the environment to create an interactive music system. Another interactive music system known as Sonic City, also disclosed above, can be considered an opposite "open loop" system in that Sonic City uses the environment as input rather than using signals to affect the environment (i.e., Sonic City is an input device used to affect musical composition). Another embodiment of the embodied music system combines the embodiments of the embodied music system discussed above with the Sonic City system (for that purpose, the Sonic City system is incorporated in this document by reference). The result is a "closed-loop" system that both controls and reacts to the multi-sensory listening environment. In this closed-loop embodiment, the embodied music system is affected by as well as affecting the physical listening environment.

The embodied music system offers the promise of contemporary technology to the future of music. Current interactive music systems have failed to move beyond novelty because they often require new, unsupported standards and assume implicitly that the user desires a change of role from listener to composer or performer. Such assumptions ignore passive, sensuous experiences by requiring active engagement in the music process. The embodied music system acknowledges that listening, in its most enjoyable form, is not about doing; rather, listening is, in fact, about being.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

More specifically, streams can be encoded into multiple frequency bands simultaneously to increase bandwidth, or the same stream can be encoded into multiple bandwidths to provide robust communications, error correction and recovery, etc. The encoding/decoding algorithm can be optimized for speed or quality. The invention may be applied to analog signals other than audio, such as video or microwave communications.

What is claimed is:

1. An embodied music system, creating an interactive interface between a listener and the external environment, the system comprising:
   a physical device located in the environment and providing sensory input to the listener;
   an audio signal adapted to be heard by the listener;
   an encoder embedding control data inaudible to the listener into the audio signal using high frequency temporal coding, adding to the audio signal a high-frequency carrier signal, the encoder including (a) a frequency-domain filter adapted to clear all frequencies of a fast Fourier Transform analysis of the audio signal above about 15 kHz and create a filtered file; (b) a summation device adapted to sum the filtered file, after the filtered file has been returned to a time-domain signal, with the control data as embedded into the carrier signal to create a sound file; and (c) means for recording or storing the sound file;
   a decoder extracting the control data from the sound file and transmitting the control data to the physical device, thereby controlling operation of the device; and
   an audio reproduction device connected to the decoder and playing the audio signal for the listener,
   whereby the listener experiences multi-sensory compositions.

2. The embodied music system according to claim 1 wherein the physical device is a light, a surface, a musical instrument, a robot, a kinetic sculpture, a thermal control, a scent generator, a sound generator, or a taste generator.

3. The embodied music system according to claim 2 wherein the sensory input is at least one of light, scent, sound, tactile, thermal, and taste.

4. The embodied music system according to claim 1 wherein the encoder embeds the control data into the audio signal in a manner that is compliant with current digital audio standards.

5. The embodied music system according to claim 1 wherein the encoder embeds the control data into the audio signal using digital watermarking or hidden data encoding methods.

6. The embodied music system according to claim 1 wherein the control data is embedded into the carrier signal with a frequency limited by the upper-bounds of the digital audio standard used and by the lower-bounds of the human ear's insensitivity to high frequency audio content.

7. The embodied music system according to claim 1 wherein the control data is embedded into the carrier signal with a frequency limited by the upper-bounds of the digital audio standard used and by the lower-bounds of 17.5 kHz.

8. The embodied music system according to claim 1 wherein the control data is embedded into the carrier signal with a frequency of 18 kHz in a manner that is compliant with current digital audio standards.

9. The embodied music system according to claim 1 wherein the encoder and the decoder use amplitude modulation.

10. The embodied music system according to claim 1 wherein the encoder and the decoder use inter-signal discrimination.

11. The embodied music system according to claim 1 wherein the decoder transmits the control data to the physical device using BlueTooth technology.

12. The embodied music system according to claim 1 further including an input adapted to receive data from the external environment.

13. An embodied music system, creating an interactive interface between a listener and the external environment, the system comprising:
- a physical device located in the environment and providing sensory input to the listener;
- an audio signal adapted to be heard by the listener;
- an encoder embedding control data inaudible to the listener into the audio signal using high frequency temporal coding, adding to the audio signal a high-frequency carrier signal, the encoder including (a) a frequency-domain filter adapted to clear all frequencies of a fast Fourier Transform analysis of the audio signal above about 15 kHz and create a filtered file; (b) a summation device adapted to sum the filtered file, after the filtered file has been returned to a time-domain signal, with the control data as embedded into the carrier signal to create a sound file; and (c) means for recording or storing the sound file;
- a decoder extracting the control data from the sound file and transmitting the control data to the physical device, thereby controlling operation of the device;
- an audio reproduction device connected to the decoder and playing the audio signal for the listener; and
- a connector adapted to enable connection of the embodied music system to a second embodied music system, creating a string of systems,
- whereby the listener experiences multi-sensory compositions.

14. An embodied music system, creating an interactive interface between a listener and the external environment, the system comprising:
- a physical device located in the environment and providing sensory input to the listener;
- an audio signal adapted to be heard by the listener;
- an encoder embedding control data inaudible to the listener into the audio signal using high frequency temporal coding, adding to the audio signal a high-frequency carrier signal in a manner that is compliant with current digital audio standards, transmitting the inaudible control data within the audio signal by exploiting the insensitivity of the human ears to small phase differences between two signals one presented to each ear, and transmitting each of the embedded carrier signals at constant and low amplitude;
- a decoder extracting the control data from the audio signal and transmitting the control data to the physical device, thereby controlling operation of the device; and
- an audio reproduction device connected to the decoder and playing the audio signal for the listener,
- whereby the listener experiences multi-sensory compositions.

15. The embodied music system according to claim 14 wherein the physical device is a light, a surface, a musical instrument, a robot, a kinetic sculpture, a thermal control, a scent generator, a sound generator, or a taste generator.

16. The embodied music system according to claim 15 wherein the sensory input is at least one of light, scent, sound, tactile, thermal, and taste.

17. The embodied music system according to claim 14 wherein the control data is embedded into the carrier signal with a frequency limited by the upper-bounds of the digital audio standard used and by the lower-bounds of the human ear's insensitivity to high frequency audio content.

18. The embodied music system according to claim 14 further including a connector adapted to enable connection of the embodied music system to a second embodied music system, creating a string of systems.

19. The embodied music system according to claim 14 further including an input adapted to receive data from the external environment.

20. An embodied music system, creating an interactive interface between a listener and the external environment, the system comprising:
- a physical device selected from the group consisting of a light, a surface, a musical instrument, a robot, a kinetic sculpture, a thermal control, a scent generator, a sound generator, or a taste generator located in the environment and providing sensory input to the listener, the sensory input being at least one of light, scent, tactile, thermal, and taste;
- an audio signal adapted to be heard by the listener;
- an encoder embedding control data inaudible to the listener into the audio signal using high frequency temporal coding, adding to the audio signal a high-frequency carrier signal in a manner that is compliant with current digital audio standards, the encoder including (a) a frequency-domain filter adapted to clear all frequencies of a fast Fourier Transform analysis of the audio signal above about 15 kHz and create a filtered file, (b) a summation device adapted to sum the filtered file, after the filtered file has been returned to a time-domain signal, with the control data as modulated onto an 18 KHz wave to create a sound file, and (c) means for recording or storing the sound file;
- a decoder extracting the control data from the audio signal and transmitting the control data to the physical device, thereby controlling operation of the device;
- an audio reproduction device connected to the decoder and playing the audio signal for the listener, whereby the listener experiences multi-sensory compositions;
- a connector adapted to enable connection of the embodied music system to a second embodied music system, creating a string of systems; and
- an input adapted to receive data from the environment external to the system.

* * * * *